(12) United States Patent
Jackson et al.

(10) Patent No.: US 6,321,604 B1
(45) Date of Patent: Nov. 27, 2001

(54) ELECTRO-OPTICAL FLOAT POSITION INDICATOR

(75) Inventors: George R. Jackson, Southampton; Donald C. Frick, Richboro; Wayne D. Tessarvich, Hartsville, all of PA (US)

(73) Assignee: World Wide Plastics, Inc., Trevos, PA (US)

(*) Notice: Subject to any disclaimer, the term of this patent is extended or adjusted under 35 U.S.C. 154(b) by 0 days.

(21) Appl. No.: 09/418,951

(22) Filed: Oct. 15, 1999

Related U.S. Application Data (60) Provisional application No. 60/104,844, filed on Oct. 16, 1998.

(51) Int. Cl.[7] ............................................. G01F 1/24
(52) U.S. Cl. .................................. 73/861.56; 250/559.12; 250/573; 250/577; 250/208.1
(58) Field of Search .............................. 73/861.56, 323, 73/322.5; 250/559.12, 573, 577, 208.1

(56) References Cited

U.S. PATENT DOCUMENTS

| | | | |
|---|---|---|---|
| 4,298,800 | * 11/1981 | Goldman | 250/455 T |
| 5,144,149 | * 9/1992 | Frosch | 250/493.1 |
| 5,185,638 | * 2/1993 | Conzola et al. | 250/227.29 X |
| 5,223,706 | * 6/1993 | Swenson, Jr. | 250/227.21 |
| 5,379,651 | * 1/1995 | Doolittle | 73/861.56 |

* cited by examiner

Primary Examiner—Benjamin R. Fuller
Assistant Examiner—C Dickens
(74) Attorney, Agent, or Firm—Volpe and Koenig, P.C.

(57) ABSTRACT

A device for converting a position of a float member in a rotameter in to an electrical output. Light from a light source is collimated into parallel light rays, at either or both opposing sides of a rotameter tube to greatly enhance accuracy of readings. The lightrays passing through the tube are detected by a linear optical array. A range of movement capable of being read by the linear optical array is extended by use of either a fiber optical array or a movable illumination device and linear optic array. The collimator(s) may be a linear array of one or two rows of cylindrical lenses sandwiched between a pair of plates. The linear optic array maybe arranged on opposite sides of the rotameter tube or may be on the same side there of. A light guide is used in the latter arrangement to guide light from the light source to a side of the rotameter tube opposite the linear optic array which may be a charge-coupled device(CCD).

28 Claims, 11 Drawing Sheets

ELECTRO-OPTICAL FLOAT POSITION INDICATOR

This application claims benefit of Provisional No. 60/104,844 filed Oct. 16,1998.

FIELD OF THE INVENTION

The present invention relates to rotameters and more particularly to novel electro-optical apparatus for providing highly accurate readings of a rotameter while providing an apparatus of a simplified and yet compact design.

BRIEF DESCRIPTION OF THE FIGURES

FIGS. 9a, 9b, and 9c are top, front and enlarged views

DESCRIPTION OF THE INVENTION INCLUDING BACKGROUND

The present invention relates to rotameters and more particularly to providing highly accurate readings of rotameter through the use of electro-optical means and especially such electronic means, which is of a simplified design and is highly compact.

Figure 1A:
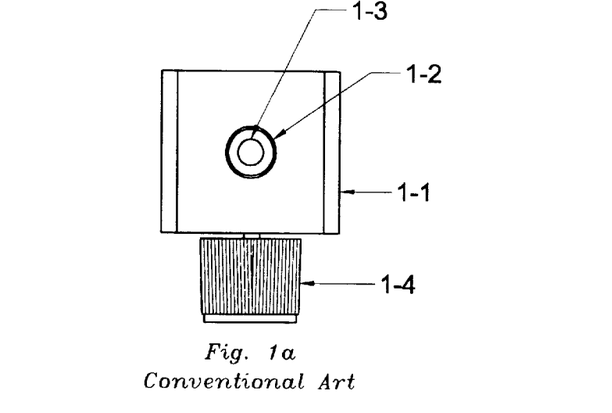
FIGS. 1a and 1b are top and front views of a conventional rotameter.
Figure 1B:
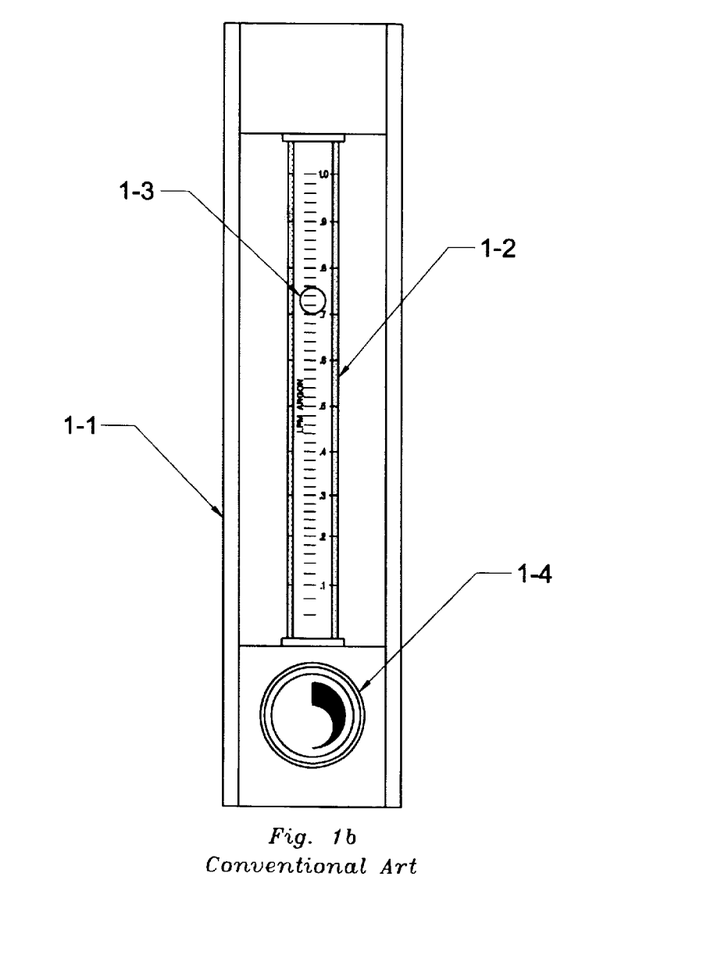

A basic flow measuring instrument, 1—1, shown in FIGS. 1a, 1b is comprised of a tapered tube 1-2 with a float 1-3 inside and graduations on the tube, and is designed to be visually read to determine flow rate by referencing the float position to the graduation scale. Valve 1-4 is attached to or incorporated in to the instrument 1—1 to control the flow either manually or automatically.

OBJECTS OF THE INVENTION

It is therefore an object of the present invention to provide a highly compact and accurate electro-optical sensor display and transmission device integrated in to a rotameter.

DETAILED DESCRIPTION OF THE INVENTION AND PREFERRED EMBODIMENTS THEREOF

Figure 2A:
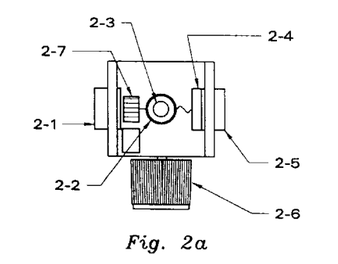
FIGS. 2a, 2b and 2c are top, front and enlarged views of apparatus embodying the principles of the present invention.
Figure 2B:
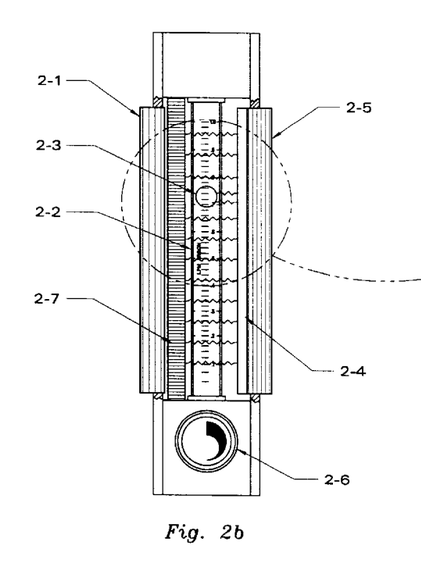
Figure 2C:
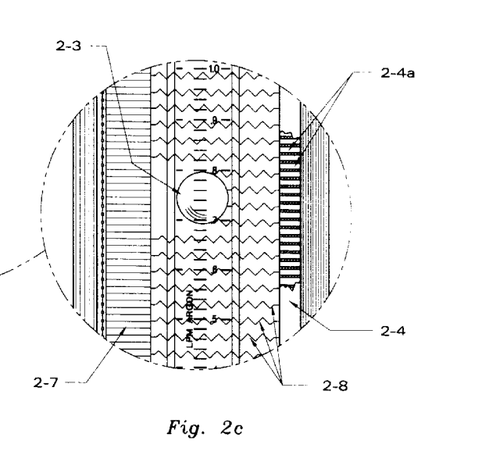

To convert a float position to an electronic signal representing the float position, an image of the float must be projected on to an electro-optical transducer. FIGS. 2a–2c show a device which includes a conventional rotameter, a linear light source 2-5 and a linear optical array 2-1 positioned on opposite sides of the rotameter. Collimator 2-4 is positioned between illuminator 2-5 and the rotameter tube to prevent distortion of the optical readings. Collimator 2-4 is comprised of layers of opaque material (dark lines) and clear material (are as between adjacent darklines) and prevents light rays from the light source from being directed diagonally upward or downward (as opposed to horizontally), which prevents the light rays from impinging upon elements of the linear optical array other than the element horizontally a cross from the individual, horizontally-aligned, light guides 2-4a of the Collimator. The lens array 2-7 (to be more fully described in connection with FIG. 3) acts to focus the light passing through tube 2—2 crisply on to the linear optical array.

The image of the float and scale impinging up on the linear optical array 2-1 is converted in to an electrical signal which is processed (i.e., conditioned) by an electronic controller so that it is filtered, scaled and the like and can thus be used to display flow rate and/or control the flow as part of a display/control system. In the preferred embodiment, the linear optical array is preferably a linear, charge-coupled-device (CCD) of the type typically employed in flat bed scanners and having pixels arranged in linear fashion.

Figure 4A:
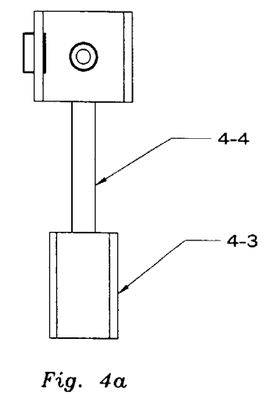
FIG. 4a is a top view of another embodiment of the present invention.
Figure 4B:
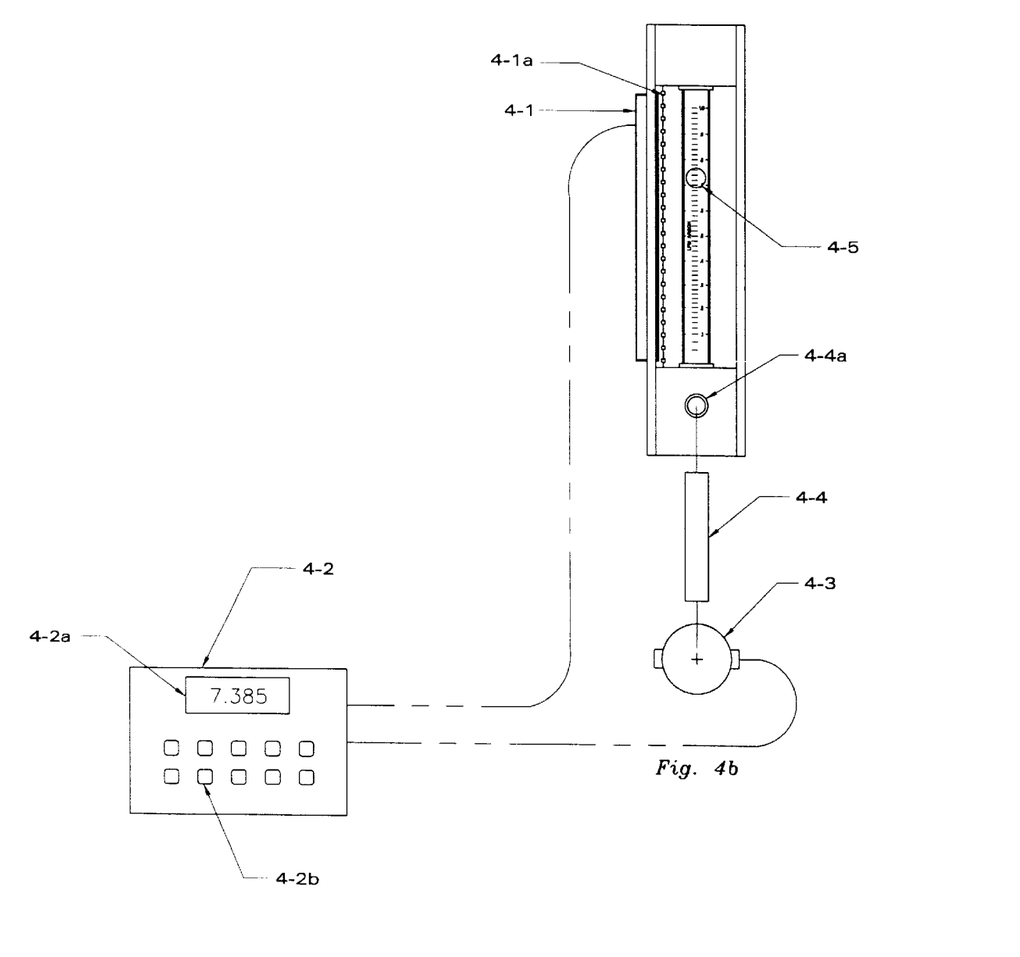
FIG. 4b is a simplified schematic front view of the embodiment of FIG. 4a showing a remote controller with display.

FIGS. 4a, 4b show a control system in which a signal is provided when a pixel of the CCD 4-1 is illuminated. Electronic controller 4-2 is set to a give upper value so that, when light impinges on pixel 4-1a, controller 4-2 picks up this signal and operates motor 4-3 to rotate drive shaft 4-4 to adjust the valve 4-4a so as to prevent flow from exceeding the given upper value. A given lower value may like wise be provided to operate motor 4-3 to control valve 4-4a to prevent the flow from dropping below the lower given value. Readings between upper and lower limits are generated on display 4-2a by pixels of the CCD 4-1 which are illuminated according to the position of the float 4-5. Keyboard 4-2b is provided to select the upper and lower limits, as well as other functions.

Figure 5A:
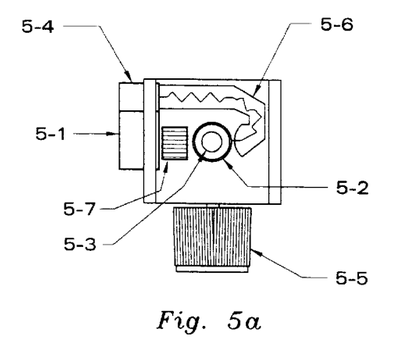
FIGS. 5a, 5b and 5c are top, front and enlarged views of another embodiment of the present invention.
Figure 5B:
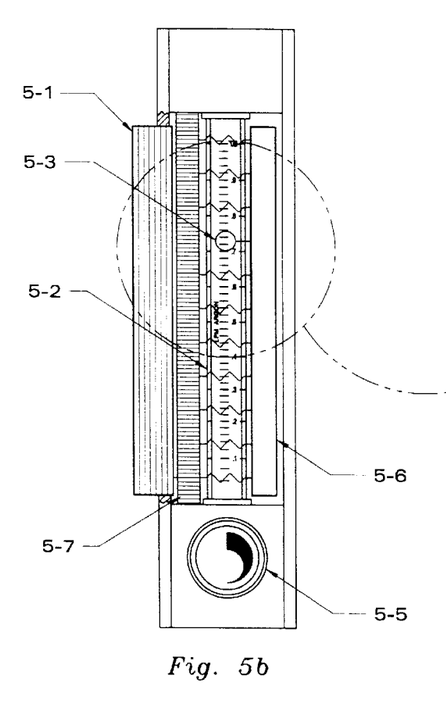
Figure 5C:
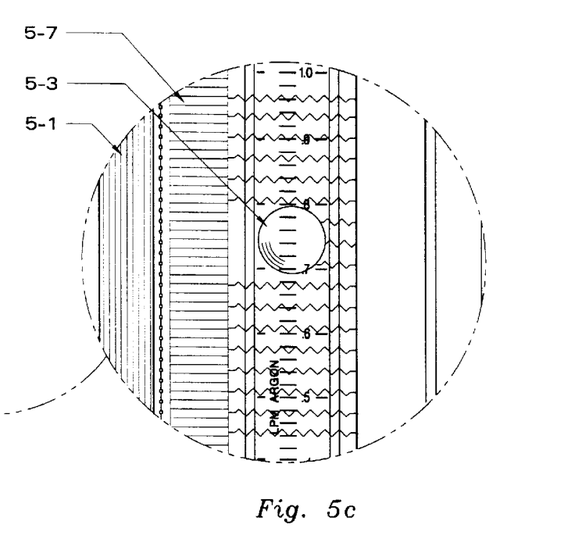
Figure 8A:
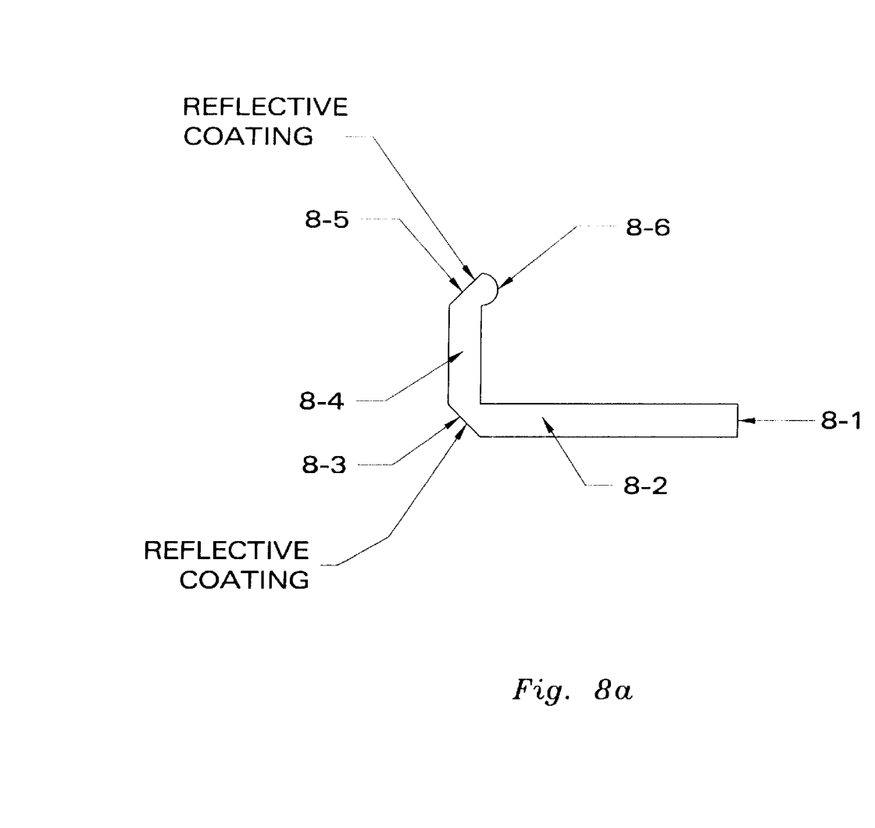
FIGS. 8a and 8b are side and end views of a light guide embodying the principles of the present invention.
Figure 8B:
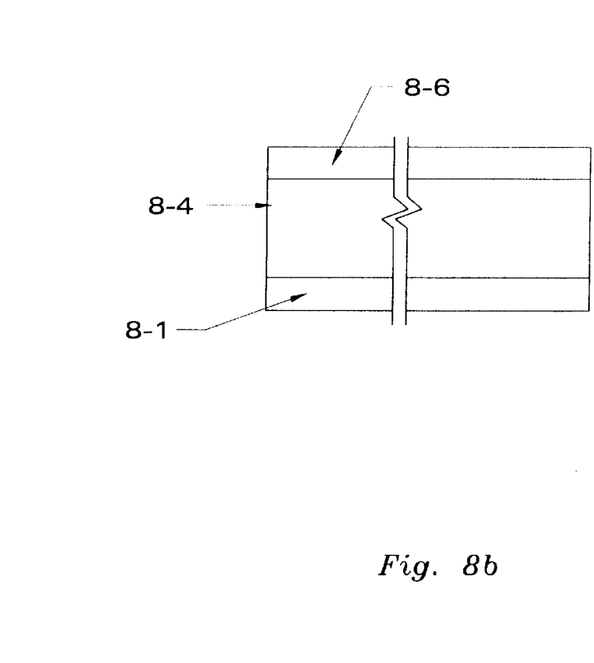

FIGS. 5a–5c show another embodiment of the present invention in which the light source and linear optical array are all arranged on the same side of the rotameter. Light source 5-4 directs light in to a substantially J-shaped light tube show in detail in FIGS. 8a and 8b which also functions as a collimator in a manner similar to collimator 2-4 shown in FIG. 2c. Light enters the input end 8-1 of the light guide and moves a long the section at 8-2. A reflective coating, such as an aluminum coating, may be provided along diagonal surface 8-3, reflecting lightrays upwardly to pass through section 8-4. A reflective coating may be applied to surface 8-5, reflecting light substantially at right angles so as to exit from the curve delongated surface 8-6 of the light guide. Alternatively, the reflective coating may be omitted since good reflection is obtained with an outer surface of the light guide which is smooth. In addition to enabling the light source and light ray tube arranged on the same side of the rotameter, the light guide performs the extremely important function of enabling the light passing there along to be substantially "homogenized" and there by provide output light at the elongated, curved output surface 8-6 which is collimated. The elongated curved surface 8-6 functions as a lens, which further enhances collimation of the light. If desired, the light guide maybe of increased length beyond that shown in FIG. 8a to there by increase the path length along which the light entering the light guide passes to further enhance and promote collimation of the light outputted by the light tube. The collimated light leaving light guide 5-6 passes through tube 5-2 and is further focused by lens array 5-7 before impinging upon linear optical array 5-1.

Figure 6A:
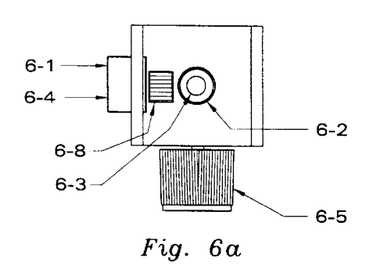
FIGS. 6a, 6b and 6c are top, front and enlarged views of still another embodiment of the present invention.
Figure 6B:
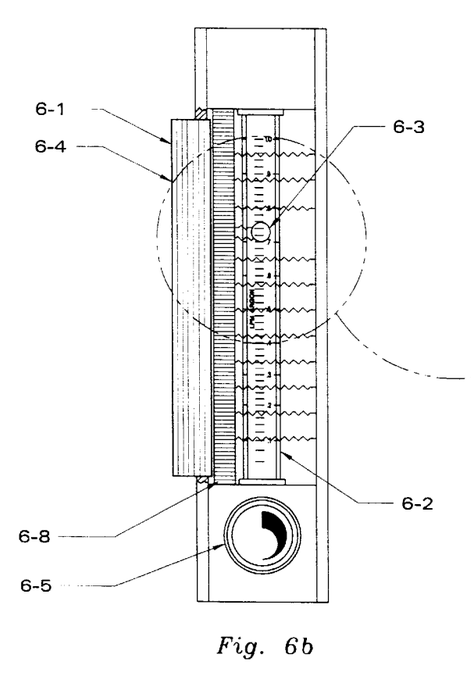
Figure 6C:
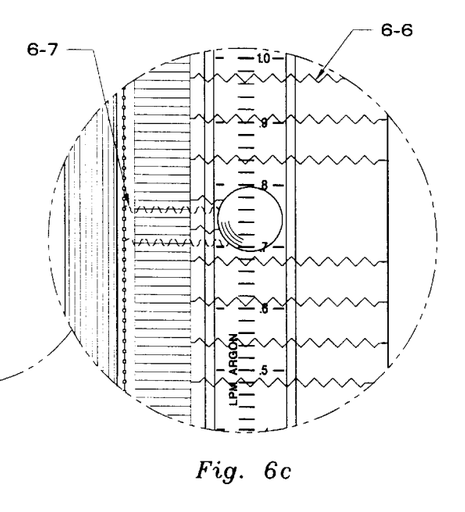

FIGS. 6a –6c show a reflective method of image projection, which can be employed as an alternative to the basic shadowing method described here in above. In this case the image will be negative as compared with the basic shadowing method. Light source 6-4 directs light rays 6—6, shown in solid-line fashion, in to the rotameter. Reflected light rays 6-7 shown in dotted-line fashion are reflected from float 6-3 and are picked up by appropriate pixels of the linear optical array (CCD) 6-1, after being focused by lens array 6-8.

Figures 7A, 7B, 7C:
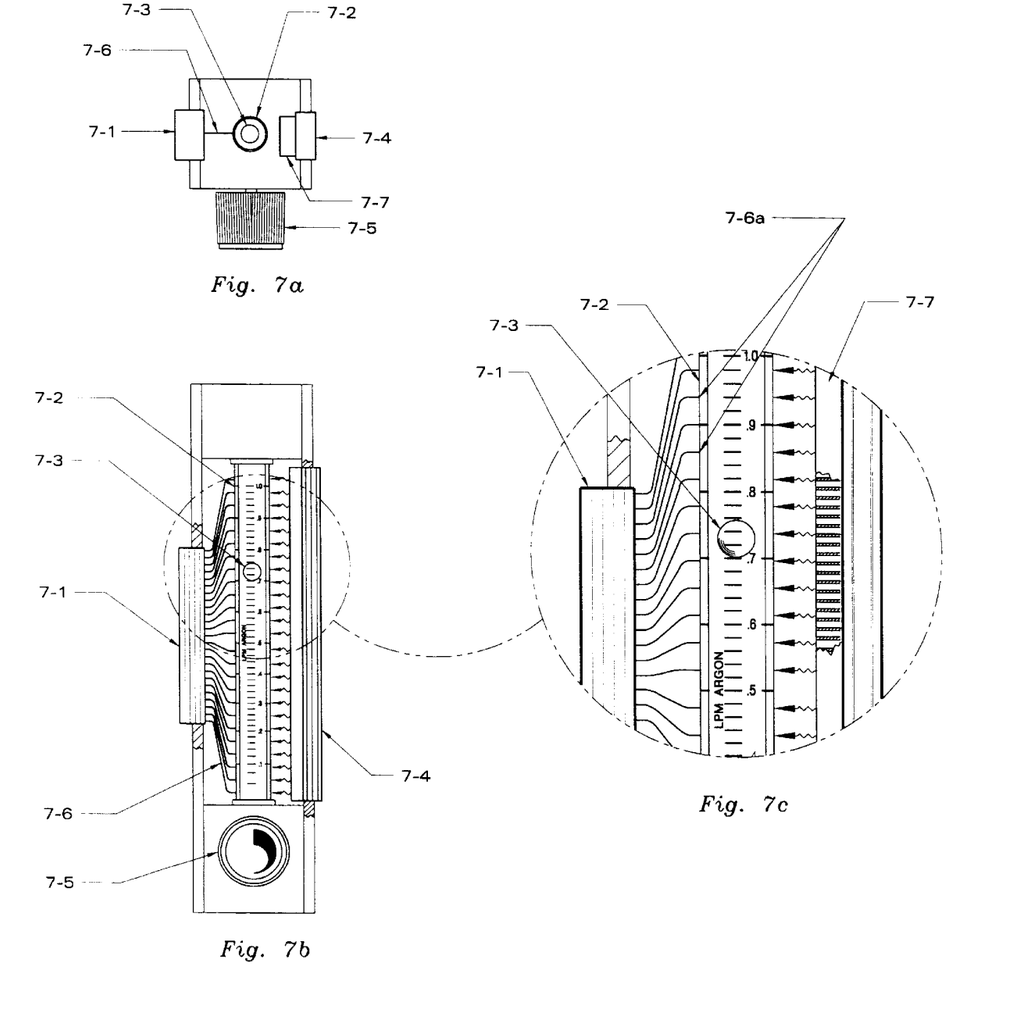
FIGS. 7a, 7b and 7c are top, front and enlarged views of still another embodiment of the present invention.

FIGS. 7a through 7c show still another embodiment of the present invention employing fiber optics. For example, when the size of an image (i. e. , the part of the rotameter to be read) is larger than the sensitive part of the linear optical array (CCD) 7-1, in order to proportionally reduce the image to fit the linear optical array, a fiber optic bundle comprised of fiber optic strands 7-6 are arranged so that heir input ends 7-6a are positioned against glass tube 7-2 to receive light rays 7—7. The fiber-optic strands 7-6 are bunched together in a linear array in the manner shown in FIGS. 7a and 7c so as to be arranged over the entire length of the linear optical array (CCD) 7-1. The arrangement of the fiber-optic bundle employed enables the use of the standard size linear CCDs, which maybe significantly shorter in length than the length of the segment of the rotameter to be monitored. The fiber optics bundle 7-6 occupies a very small space. The distance between the linear optical array 7-1 and the side of glass tube 7-2 is typically of the order of a fraction of an inch. For example, in one embodiment, the fiberoptic bundle fitted within a gap space of the order of 0.75 inches. If desired, the optical fibers may be arranged in a non-linear fashion, i.e., so that the optical fibers at either the light input end or the light output end are arranged with a non-uniform spacing. For example, the optical fibers in the middle region, between graduations 0.35 and 0.75 on the scale, may be closer together than the optical fibers below the 0.35 graduation and above the 0.75 graduation. The graduations above 0.75 and below 0.35 may be spaced gradually farther apart. The reverse or any other non-linear arrangement may be employed to emphasize a desired region of the scale.

Figure 3:
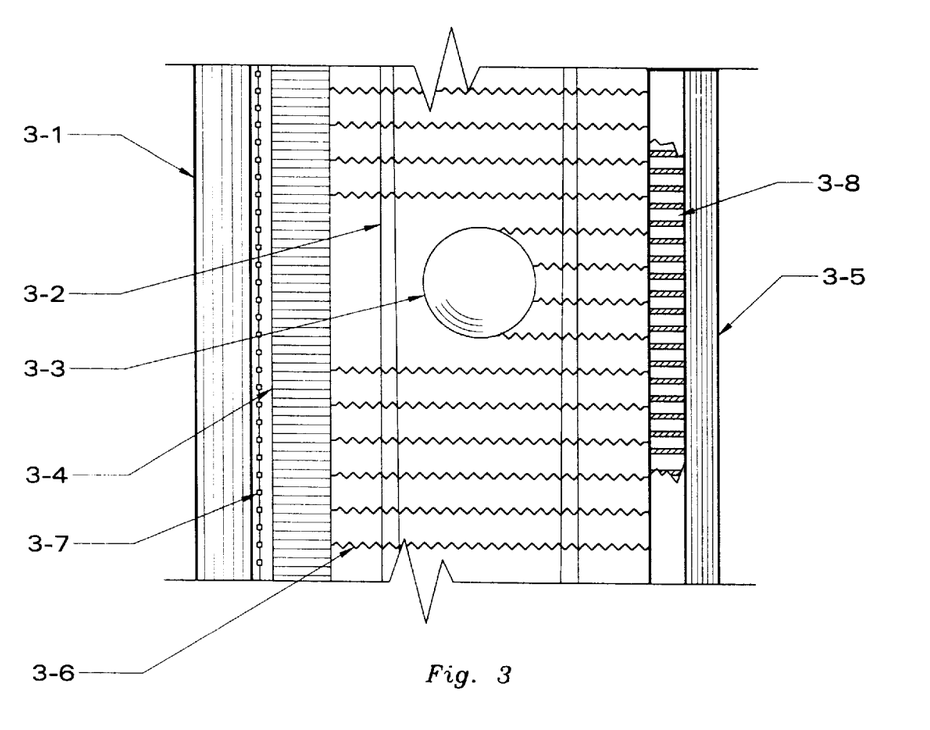
FIG. 3 is an enlarged view of another embodiment of the present invention.

FIG. 3 schematically shows a Collimator 3-8 which is comprised of a SELFOC LENS ARRAY (SLA) manufactured by Nippon Sheet Glass Company of Kanagawa, Japan. The lens array has a very short total conjugate (i.e., the distance between the object and the focused image), which can be a small as 9 mm, providing a very compact, high precision Collimator. The , array can be of any length and can be provide d with either a single row of lenses 3-4a or a double row, if desired. Also, an SLA-type Collimator 3-4' may be provided between tube 3-2 and linear optical array 3-1.

An SLA-type collimator 5-7 and 6-8 may be respectively provided in the embodiments shown in FIG. 5 as shown in dotted-fashion in FIG. 5c and in the embodiment of FIG. 6, as shown in FIG. 6c.

Figure 3A:
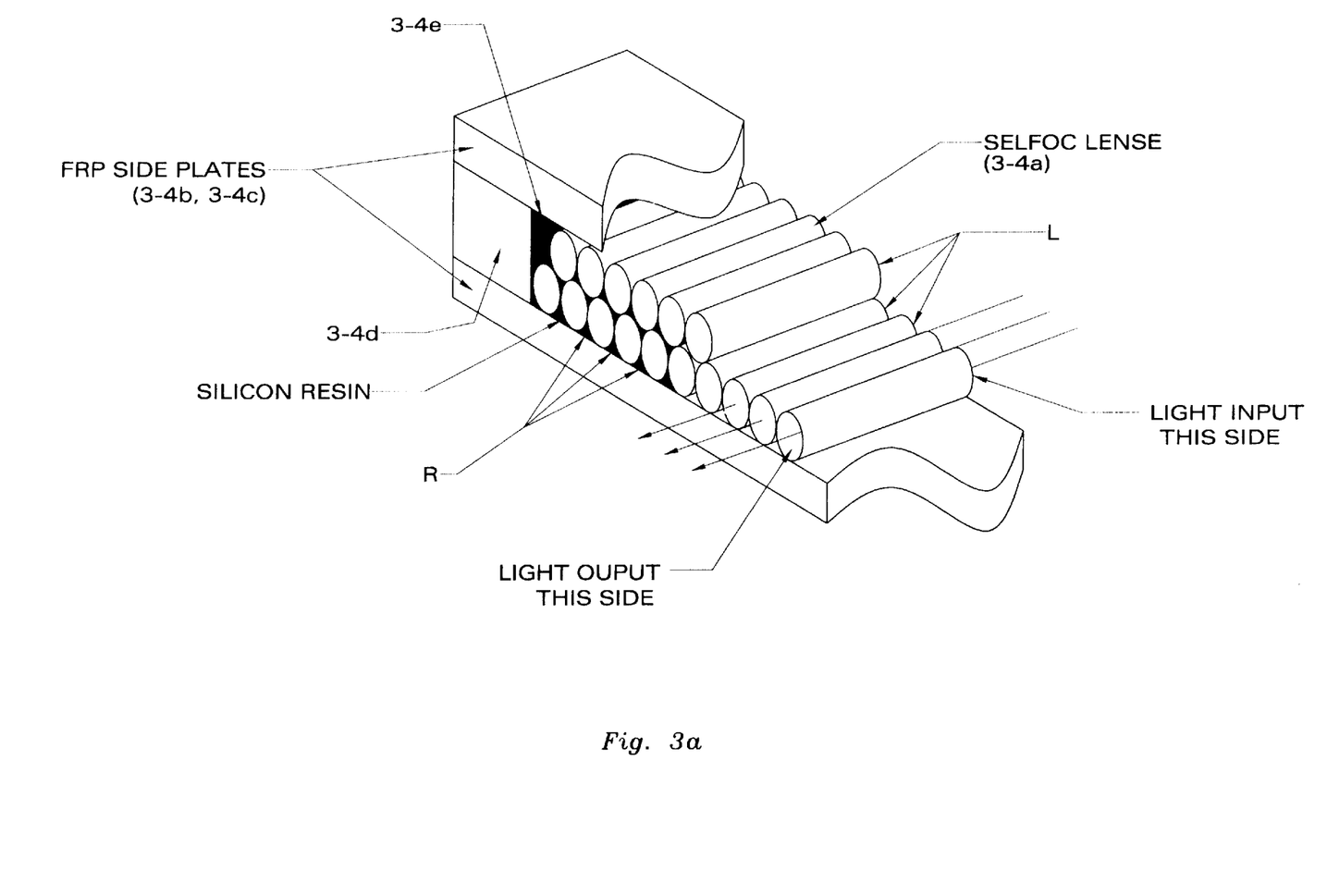
FIG. 3a is a perspective view of the Collimator/focusing element employed in FIG. 3.

FIG. 3a shows a simplified schematic arrangement of an SLA which is comprised of either one or two rows of cylindrical-shaped lenses 3-4a sandwiched between a pair of fiberglass-reinforced plates (FRP) 3-4b, 3-4c having a coefficient of thermal expansion which is the same as the glass lenses. A silicon resin R fills the voids within the regions between plates 3-4b, 3-4c and end plates 3-4d (only one being shown in FIG. 3a ).

As shown in FIG. 3, light from source 35 passes through collimator 3-8 and light rays 36, moving horizontally, pass through glass tube 32 and move toward the linear optical array comprised of pixels 3-7. The float member 3—3 blocks rays from reaching sensor array 3-1. The lens array 3-4 focuses light emitted from tube 3-2 on to the linear optic array pixels 3-7.

FIGS. 9a–9d show another embodiment of the invention in which the light source 9-4, light guide 9-6, and the short, linear optical array (CCD) 9-1 are slidably mounted to the left sidewall of the rotameter to monitor a selectable flowrate segment.

Figure 9A:
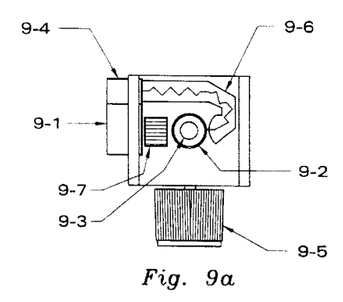
Figure 9B:
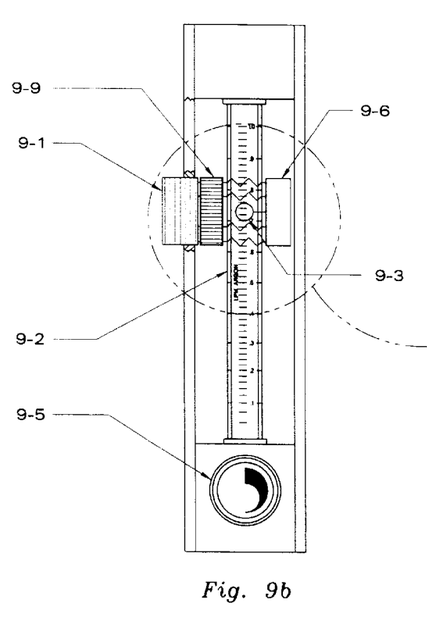
Figure 9C:
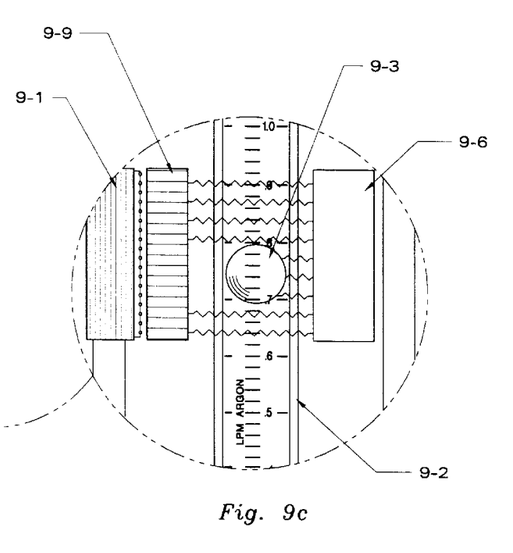
Figure 9D:
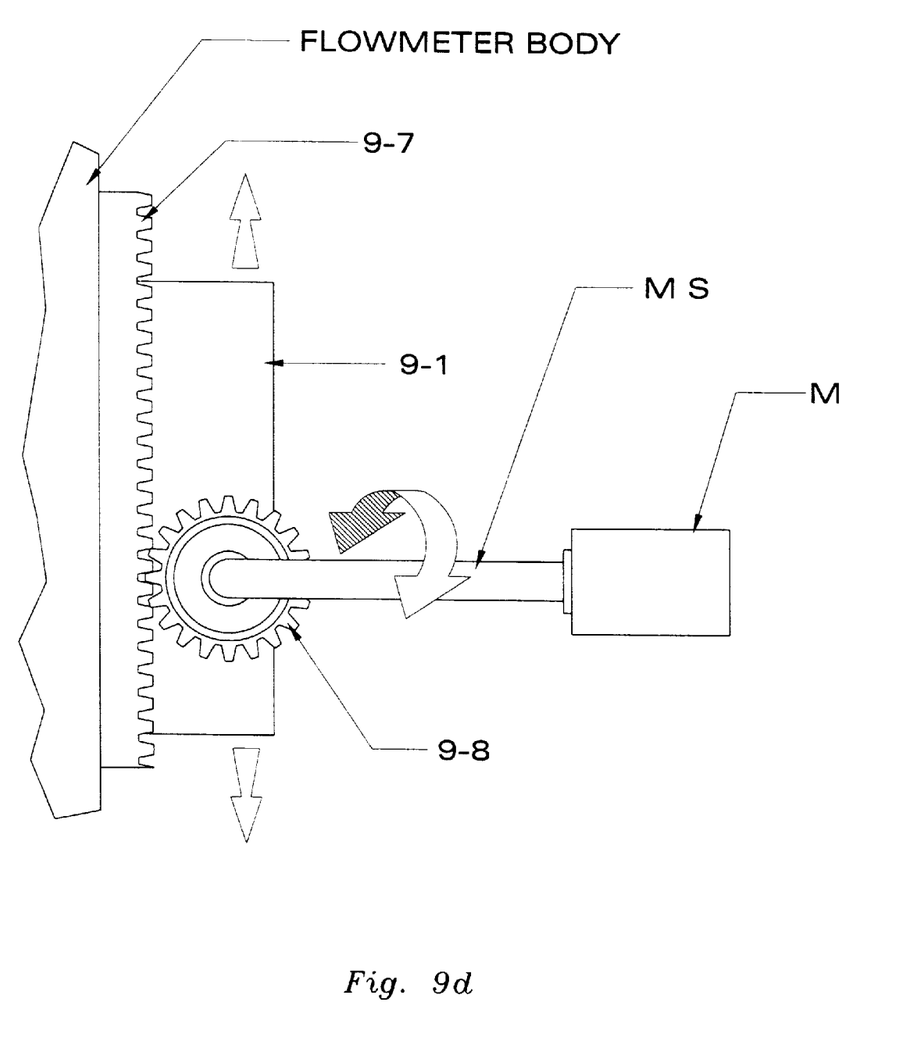
FIG. 9d is a simplified schematic view of a driving means for the optical electronic reading apparatus of still another embodiment of the present invention.

The light source 9-4, light tube 9-6, lens array 9—9 and linear optical array 9-1 may be joined to move with a rack 9-7 arranged to slide along the left sidewall of the rotameter, as shown in FIG. 9d. A stationary motor M drives a spur gear 9-8 mounted upon an output shaft MS of the motor to selectively move rack 9-7 and, hence, the optical reading apparatus either upwardly or downwardly as given upper and lower limit pixels of the CCD indicate that the float is moving out of the range of the optical reading apparatus.

Alternatively, the rack may be mounted in a stationary manner and the motor and sensor array arranged to move up and down with rotation of the spur gear 9-8. The apparatus described above, for example, see FIG. 4, may be used for a variety of applications. For example, in order to "smooth" the optical reading in applications where the float oscillates continuously, a number of readings are taken at closely spaced time intervals by a microprocessor-based controller such as controller 4-2 in FIG. 4b is utilized.

The readings taken are averaged to provide a flowrate reading which appears as though the float were not oscillating.

The display may be digital as shown in FIG. 4b or may be an analog display or may be a bar graph type of display.

The electronic signals may be transmitted to remote locations in either digital or analog format. The data may be used for data acquisition, process control, liquid level control, flow rate control and/or may provide an audible and/or visual alarm when given upper and/or lower limits are reached.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. In combination a rotameter and an electro-optical device for providing an electronic read-out from, said rotameter comprising:

a hollow tube and a float member arranged to move along a substantially linear path in said tube to represent a fluid flow value;

an illumination device for directing light rays toward one side of said tube;

a linear optical array for detecting light rays passing through said tube, said float member altering intensity of the light rays impinging on said float member;

said linear optical array detecting said light rays over a range of movement of the float member along said tube for generating electrical signals representing a position of said float member; and a collimator arranged adjacent to said illumination device for collimating the emitted light to provide substantially parallel light rays arranged at right angles to said path.

2. The combination of claim 1 wherein said linear optical array comprises a linear array of light-sensitive pixels for converting light impinging thereon in to an electrical signal, a magnitude of said signal representing a magnitude of light impinging thereon.

3. The combination of claim 2 wherein said linear optical array is a CCD-type sensor.

4. The combination of claim 1 further comprising a second collimator arranged to collimate light rays directed toward said linear optical array from said first mentioned collimator.

5. The combination of claim 1 wherein said collimator comprises of a row of cylindrical-shaped lenses.

6. The combination of claim 5 wherein said cylindrical-shaped lenses are sandwiched between a pair of plates.

7. The combination of claim 6 wherein said plates have a coefficient of thermal expansion which is the same as that of the lenses.

8. The combination of claim 1 wherein said illumination device and said linear optical array are on opposing sides of said tube.

9. The combination of claim 1 wherein said illumination device is further comprised of a light source and a light guide;
  said light source and said linear optical array being arranged on one side of said tube;
  said light guide guiding light from said light source to a side of said tube opposite said light source and said linear optical array, an output end of said light guide directing light rays toward said linear optical array.

10. The combination of claim 9 wherein said light guide is a substantially J-shaped member having an input end for receiving light rays from said light source, said output end being on said opposite side of said tube for directing light rays through said tube and toward said linear optic array.

11. The combination of claim 10 wherein said output end has a curved, convex shape to function as a lens for focusing light.

12. The combination of claim 1 wherein said illumination device is a light source arranged adjacent to said linear optical array, said light source and linear optical array being arranged on one side of said tube, said optical linear array detecting light rays reflected from said float member.

13. The combination of claim 1 further comprising a device for moving said linear optical array and said illumination device along said tube when said float member moves near an end of said linear optical array as detected by said array to move said array and illumination device in a direction of movement of said float member.

14. The combination of claim 1 further comprising a controller for adjusting a flow of fluid detected by said rotameter responsive to an output from said linear optical array to maintain a flow rate within a given range.

15. The combination of claim 14 wherein said controller further comprises an adjustable valve for controlling flow rate and a device for operating said adjustable valve responsive to an output of said linear optical array.

16. The combination of claim 1 further comprising means for providing a digital display responsive to an output of said linear optical array.

17. The combination of claim 1 further comprising a fiber optic array comprised of a plurality of optical fibers each having linearly arranged input ends and linearly arranged output ends;
  said float member being movable over a given range along said tube;
  said linear optic array being of a given length;
  a length of said range being greater than the given length of said array;
  the optical fibers of said fiber optic array being arranged so that said input ends are arranged at spaced intervals along said tube to detect a position of said float member over said range of movement;
  the output ends of said optical fibers being arranged at spaced intervals along said linear optical array for directing light thereto;
  the spaced intervals between the input ends of said optical fibers being different from the spaced intervals between output ends of said optical fibers.

18. The combination of claim 17 wherein the spaced intervals of at least portions of said input ends are non-linear.

19. The combination of claim 17 wherein the spaced intervals of at least portions of said output ends are non-linear.

20. The combination of claim 17 wherein said fiber optic array occupies a small compact space between said tube and said linear optic array.

21. The combination of claim 20 wherein the fiber optic array is positioned within a gap space between said tube and said linear optic array which is of the order of 0.75 inches.

22. The combination of claim 1 further comprising a controller for converting an output from said linear optical array to an output representing a position of the float member in said tube.

23. The combination of claim 21 wherein said controller generates a digital output.

24. The combination of claim 22 wherein said controller generates an analog output.

25. The combination of claim 22 wherein said controller averages a given plurality of outputs from said linear optic array to smooth an oscillating movement of said float member.

26. The combination of claim 1 wherein said collimator comprises an array of alternating clear and opaque layers.

27. The combination of claim 4 wherein on of said collimators is a lens array and the other one of said collimators comprises an array of alternating clear and opaque layers.

28. The combination of claim 1 further comprising a second collimator arranged to collimate light rays directed toward said linear optical array from said first mentioned collimator and focus the light rays upon the linear optic array.

* * * * *